UNITED STATES PATENT OFFICE.

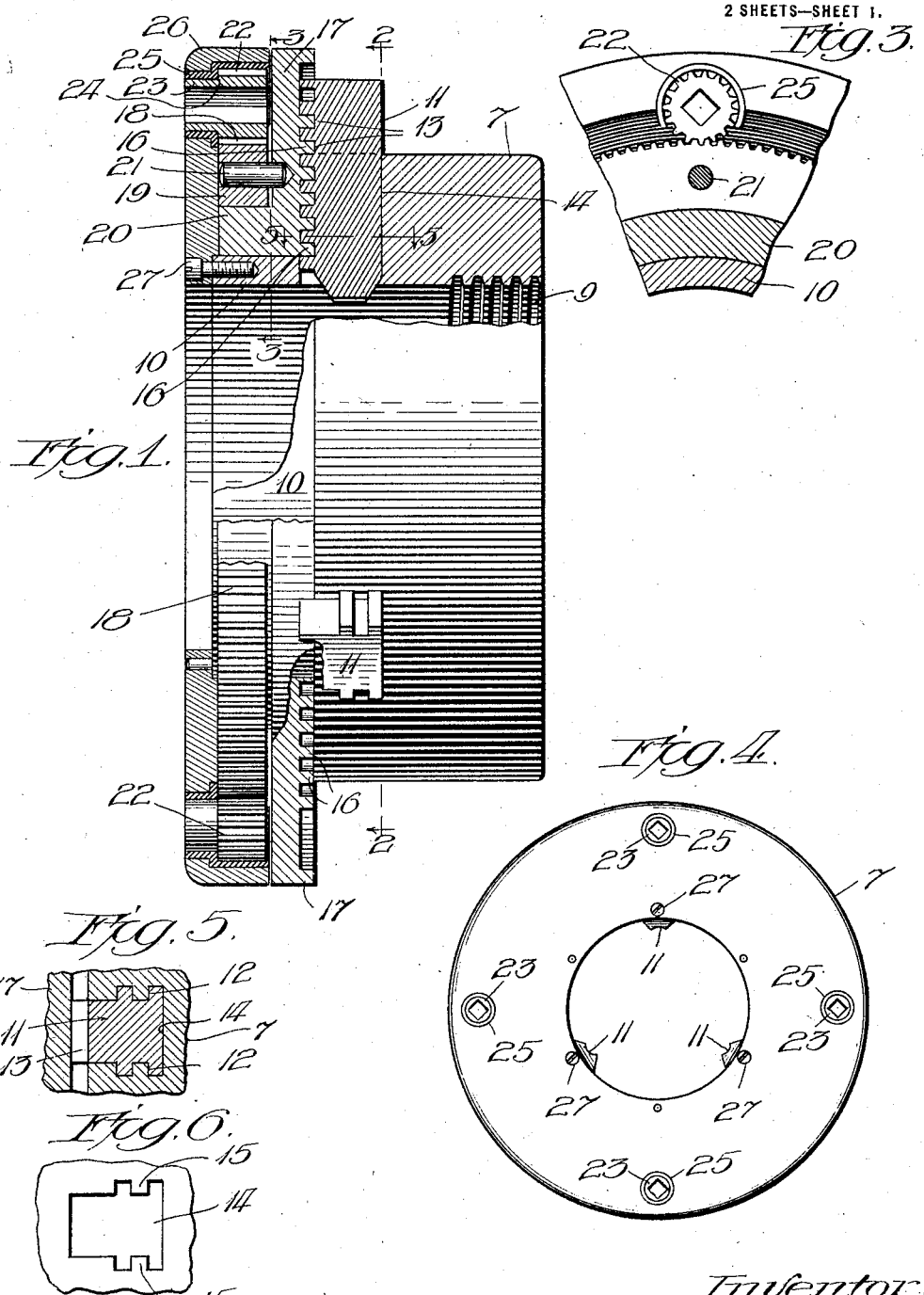

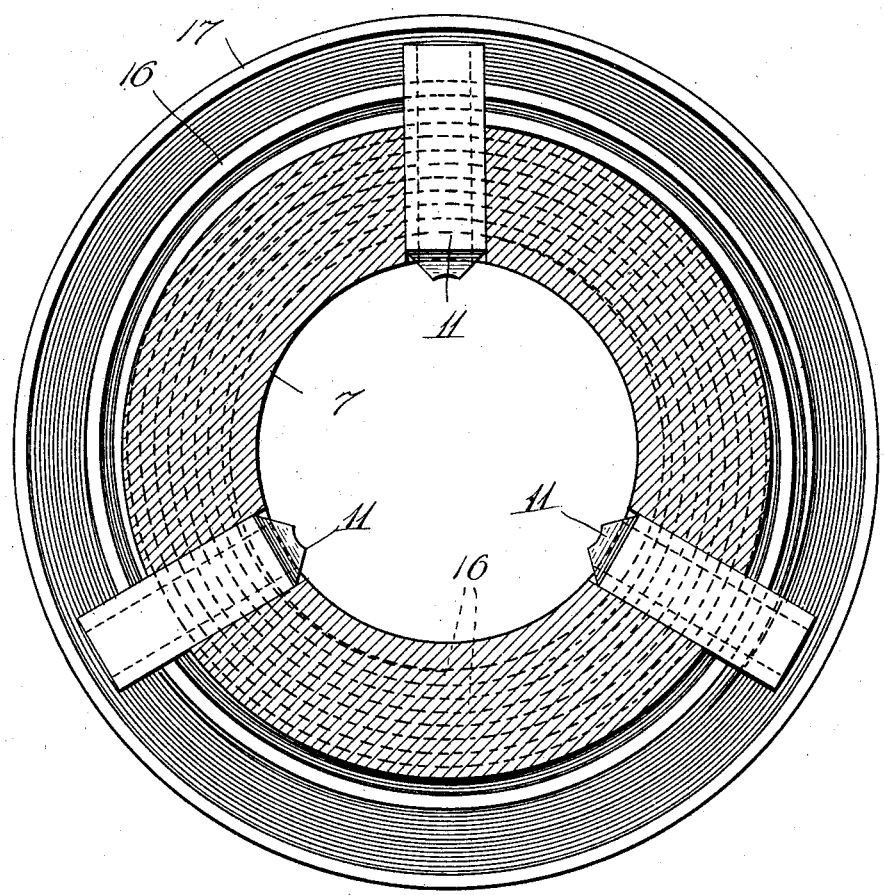

ALBERT H. SEGLER, OF CHICAGO, ILLINOIS.

CHUCK.

1,391,908.  Specification of Letters Patent.  Patented Sept. 27, 1921.

Application filed April 3, 1919. Serial No. 287,166.

*To all whom it may concern:*

Be it known that I, ALBERT H. SEGLER, a citizen of the United States, residing at Chicago, in the county of Cook and State of Illinois, have invented a new and useful Improvement in Chucks, of which the following is a specification.

My invention relates to improvements in chucks used on lathes and other machines for turning objects and provided for the purpose of holding the work to be operated on, being used sometimes for holding one end only of the work, the other end being engaged by a centering device.

My primary object is to provide improvements in chucks as hitherto provided to the end that the work may be readily and tightly gripped therein and that the structure be simple, compact and economical of construction.

Referring to the accompanying drawings, Figure 1 is a view in side elevation, partly sectional, and with certain parts broken away, of a chuck constructed in accordance with my invention. Fig. 2 is a section taken at the line 2—2 on Fig. 1 and viewed in the direction of the arrows. Fig. 3 is a broken fragmentary section, taken at the line 3—3 on Fig. 1 and viewed in the direction of the arrows. Fig. 4 is a reduced view of the outer face of the chuck, this view being taken from the left-hand side of Fig. 1. Fig. 5 is a broken fragmentary sectional view taken at the line 5 on Fig. 1 and viewed in the direction of the arrow; and Fig. 6, a plan view, with parts broken away, of the body of the chuck, this view showing the shape of similar radial openings therethrough in which the jaws operate.

As a preface to the following description, it may be stated that my improvements may be incorporated in chucks of different types, but for purposes of illustration I have chosen to show it in a chuck of the type involving a body member threaded at one end at which it is adapted to screw upon the threaded spindle of a lathe. Accordingly, the body portion referred to is represented at 7, this member being of circular shape in cross-section and hollow, with an internal thread at 9 to adapt it to screw upon the threaded end of a spindle of a lathe (not shown). The body 7 is formed at the end thereof opposite its threaded portion 9, with a hollow cylindrical concentric extension 10 upon which the rotatable jaw-adjusting member hereinafter referred to is rotatably mounted. The jaws of the chuck are represented at 11, the device being shown as equipped with three of them, though the number may be varied, as desired. Each of these jaws, which is adapted to be adjusted lengthwise toward and away from the axis of the member 7 through the central opening in the latter, is grooved at its opposite edges, as represented at 12, and one face thereof is provided with the segmental spiral grooves 13. The jaws 11 which extend radially of the axis of the member 7, slidingly fit in and conform to the walls of openings 14 provided in this member, these walls, by preference, being provided with flanges 15 which extend into the grooves 12 in the jaws.

The jaws 11, thus adapted to be adjusted in and out on the member 7, radially thereof, mesh at their grooved portions 13 with a spiral flange 16 formed on the adjacent face of a disk 17 rotatably mounted on the cylindrical extension 10, it being understood that by rotating the spiral 16 in one direction, the jaws 11 will be simultaneously shifted outwardly in a radial direction and upon rotating the spiral in the opposite direction the jaws will be simultaneously shifted inwardly of the member 7. The member 17 is operatively connected with a gear shown at 18 as a spur-gear, this gear being preferably formed on a ring 19 separate from the disk 17 and encircling an annular reduced portion 20 of the latter, with pin connection as represented at 21, between the members 17 and 19 to cause them to rotate as a unit. At intervals about the circumference of the gear 18 are spur-pinions 22 meshing with the teeth of the gear 18 and through the medium of any one of which, when rotated, the gear 18 and consequently the member 17, may be rotated in either direction. The spur-pinions 22 are shown as provided with hollow extensions 23 of reduced diameter affording the annular shoulders 24, these pinions being mounted in hardened steel bushings 25 confined in a cap-plate 26 secured to the extension 10, as by the screws 27. The interiors of the portions 23 of the pinions 22, as preferably the body of the gear itself, are shaped to permit a tool, such as the usual chuck-adjusting tool, or ratchet-wrench, to be introduced into the pinion for rotating it.

From the foregoing, it will be noted that the pinions 22 are operated by the application of a turning device or tool thereto, through one face of the chuck instead of through the periphery of the latter, as is common practice in chucks. Furthermore, the jaws operate in guides which entirely surround them, thereby affording great stability to the structure which is of especial advantage in the use of the chuck for heavy work.

The provision of the gears as shown is of great advantage in a chuck, particularly where it is to be used for heavy work, as, for example, in the cutting or turning of heavy bars, on account of the ability of the chuck to very tightly grip the work as spring of the operating parts is practically eliminated. Furthermore, by thus providing the gears the chuck may be of very compact construction.

While I have illustrated and described a particular construction embodying my invention, I do not wish to be understood as intending to limit it thereto, as the same may be variously modified and altered without departing from the spirit of my invention, it being my intention to claim my invention as fully and completely as the prior state of the art will permit.

What I claim as new and desire to secure by Letters Patent is:

1. A chuck comprising a supporting member containing openings therethrough forming guides, jaws mounted in said guides and adjustable toward and away from the center of said member, said supporting member being provided with an annular extension of reduced external diameter, and means for adjusting said jaws comprising a rotatably mounted ring on said extension and presenting at a face thereof a spiral flange, shoulder portions on said jaws engaging said flange, said ring being formed, beyond the face thereof equipped with said spiral flange, of reduced external diameter, a spur gear mounted upon the reduced end of said ring, and a spur pinion rotatably mounted on said supporting member and meshing with said spur gear, with a portion of said spur pinion accessible at a face of the chuck at which said pinion is adapted to be engaged for rotating it, said ring at its spiral-flange-equipped portion extending radially beyond said spur gear.

2. A chuck comprising a hollow supporting member containing radially-disposed openings extending therethrough and forming guides, radially-extending jaws located in said guide openings and movable toward and away from the center of said member, said supporting member being provided with an annular extension of reduced external diameter, means for adjusting said jaws radially comprising a rotatably mounted ring on said extension and presenting at a face thereof a spiral flange, shoulder portions on said jaws engaging said flange, said ring being formed, beyond the face thereof equipped with said spiral flange, of reduced external diameter, a spur gear mounted upon the reduced end of said ring, a rotatably-mounted spur pinion meshing with said spur gear, and a disk secured to said supporting member at the reduced portion of the latter and overlapping said spur gear, said spur pinion being rotatably mounted in said disk with a portion of said spur pinion accessible at a face of said disk at which said pinion is adapted to be engaged for rotating it, said ring at its spiral-flange-equipped portion extending radially beyond said spur gear, and said jaws being entirely surrounded by the walls of the openings in said members in which they are located and the adjacent face of said ring.

ALBERT H. SEGLER.